No. 627,483. Patented June 27, 1899.
T E. COMLY.
TIRE COVERING.
(Application filed Apr. 5, 1899.)
(No Model.)

Witnesses.
J. T. Cross
Harry Miller

Inventor,
T Elwood Comly,
by James Petit
Attorney.

UNITED STATES PATENT OFFICE.

T ELWOOD COMLY, OF PHILADELPHIA, PENNSYLVANIA.

TIRE-COVERING.

SPECIFICATION forming part of Letters Patent No. 627,483, dated June 27, 1899.

Application filed April 5, 1899. Serial No. 711,764. (No model.)

*To all whom it may concern:*

Be it known that I, T ELWOOD COMLY, of the city of Philadelphia, State of Pennsylvania, have invented certain new and useful Improvements in Tire-Coverings, of which the following is a full, clear, and exact description, reference being had to the accompanying drawings, forming part of this specification.

My invention relates to an improved tire-cover for use on bicycle or other pneumatic tires; and it consists in the construction herein set forth.

The object of my invention is to provide a removable tire-cover to be applied to the tread of a bicycle or other tire, which will tend to increase the speed of the said wheel and to prevent the said tire from slipping on the roadway.

Another object of my invention is to provide a tire-covering which will prevent suction when traversing the roadway, and thereby allow the contact portion of the periphery of the tire to freely leave the surface of the road-bed in the revolution of the wheel, which allows the wheel to run more freely.

A further object of my invention is to provide a tire-covering which will prevent the throwing of mud, water, &c., upon the rider, my construction tending to deflect the mud or water in lateral directions.

With these objects in view my invention consists in providing a flexible tire-covering adapted to be secured to the tread of the tire and having provided therethrough a series of apertures, a series of laterally-disposed grooves provided on the interior surface of the tire-cover, running to the edges of the same, and a series of grooves or channels communicating the said laterally-disposed grooves with the apertures formed through the tire-cover, thus providing an escape or outlet from each aperture to the edges of the tire-covering. My invention further consists in providing each of the apertures which extend through the said tire-covering with elongated openings on their exterior, so as to provide greater space for the entrance of air through the said apertures as the tire comes in contact with the roadway. My construction also allows an escape, through said openings and laterally-disposed channels, of soft mud, &c., which may enter the said openings, and will deflect or guide the same sidewise away from the wheel instead of throwing it up over the periphery of the wheel and against the back of the rider.

Figure 1:
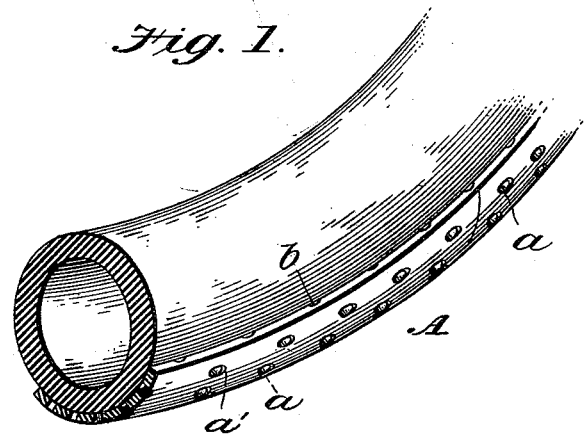
Figure 2:
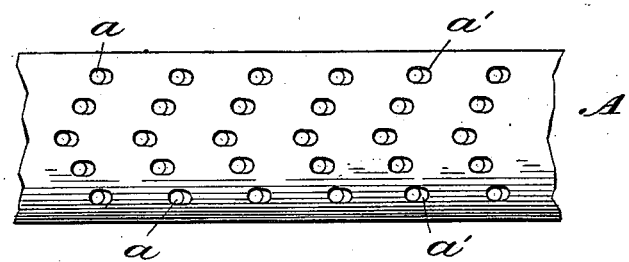
Figure 3:
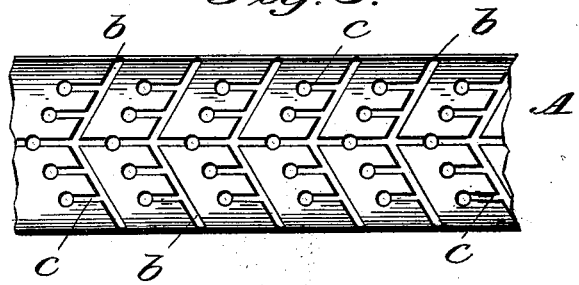
Figure 4:
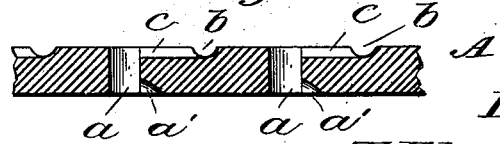

In the accompanying drawings, which fully illustrate my invention, and in which similar letters of reference are used to designate similar parts, Figure 1 is a perspective view of a section of a pneumatic tire having my improved covering applied thereto. Fig. 2 is a plan view of the exterior of the covering, illustrating the elongated openings of the apertures. Fig. 3 is a plan view of the interior of the covering, illustrating the apertures, the laterally-disposed grooves, and the communicating grooves between the apertures and the laterally-disposed grooves. Fig. 4 is an enlarged detail section taken longitudinally through a portion of my tire-covering.

In carrying out my invention I provide a strip of flexible material A of a width sufficient to cover the tread of the tire, as illustrated in Fig. 1 of the drawings, and of a length sufficient to entirely surround the outer periphery of the tire. This strip can be applied to the tire while it is deflated, and when the tire is inflated the said covering will expand and will tightly embrace the tire and be securely held in its proper position.

In the covering A, I provide a series of apertures $a$, extending therethrough, arranged in any suitable manner, but preferably as shown in the drawings, and on the outside of the said covering I form elongated openings for the said apertures $a$ by scooping out a portion of the cover in front of each of the apertures, as illustrated at $a'$ in Figs. 2 and 4 of the drawings. This forms a larger inlet for the passage of the air and enables the surface of the tire to firmly grip and come in closer contact with the pavement, and at the same time the air-passages prevent the periphery of the tire as the contacting portion leaves the surface of the road-bed in the revolution of the wheel from being held by air-pressure to the road-surface, practically destroying a tendency toward partial vacuum and eliminating suction.

On the interior surface of the covering A, I provide a series of grooves $b$, arranged substantially transversely, one series between each row of apertures and running in substantially lateral directions to the edges of the tire-cover A. In the drawings these grooves are illustrated as being V-shaped in form and extending from the center of the tire in a slanting direction toward each of the sides and the rows of apertures $a$ arranged in directions corresponding to the grooves $b$. This construction I have found to be preferable; but it is obvious that the said grooves could be arranged in straight lines transversely across the tire-covering and perform the same function. Extending from each of the apertures $a$ to the grooves $b$ in front of said apertures are the short channels $c$, which form a continuous passage-way from the exterior of the apertures $a$ to the edges of the tire-covering A, thus forming an escape for the air as the wheel comes in contact with the ground, and also for the passage of the mud and water, for the purposes as heretofore described.

When it is desired to remove the tire-cover A for cleansing or repairing purposes, it is only necessary to deflate the tire, when the cover A can be easily slipped off. Thus if the apertures and their communicating interior grooves should become clogged or otherwise stopped up the covering can be easily removed and cleansed and then replaced in a proper position in a very short space of time.

I do not wish to limit myself to the exact construction and arrangement of the apertures and grooves, as various changes might be made in their form without departing from the spirit and scope of my invention.

Having thus described my invention, what I claim, and desire to secure by Letters Patent, is—

1. A tire-covering adapted to embrace the tread of the tire, a series of apertures passing through said covering, and passages connecting the interior of the apertures with the outside edges of the cover, substantially as described and for the purpose stated.

2. A tire-covering adapted to embrace the tread of a tire having a series of apertures passing therethrough, a series of grooves provided on the interior of the tire-covering extending to the edges thereof between the rows of apertures for providing a passage-way from the exterior of the tire-surface to the interior edges of the said tire-cover, substantially as described.

3. A tire-covering adapted to embrace the tread of the tire, a series of apertures passing therethrough, a series of grooves extending substantially transversely across the said covering on its interior surface between the rows of apertures, and channels connecting the inner ends of each of the apertures with the transversely-arranged grooves, thereby providing a passage-way from the exterior surface of the tire-cover to both edges of the said cover, substantially as described.

4. The combination with a wheel-tire of a cover therefor adapted to embrace the tread of the said tire, apertures passing through the said cover, grooves connecting the inner ends of the said apertures with the inner edges of the cover, and elongated openings provided on the outer surface of the said cover in front of the apertures, substantially as described.

5. The combination with a pneumatic tire of a flexible removable cover adapted to embrace the tread of the said tire, a series of transversely-arranged grooves provided on the interior of the cover thus forming a passage-way between the periphery of the tire and the said cover to the outside edges of the cover, and a series of apertures extending through the tire-cover communicating with the transversely-arranged passage-way, substantially as described.

6. The combination with a pneumatic tire of a flexible cover adapted to embrace the tread of the said tire, a series of transversely-arranged grooves provided on the interior of the said cover, thus forming a substantially transverse passage-way between the periphery of the tire and the cover, a series of apertures passing through the cover, channels communicating the interior of the apertures with the transverse passage-ways, and means for removably securing the said cover on the tire, substantially as described.

7. A tire-covering adapted to embrace the periphery of the tire, apertures, $a$, provided through said covering, enlarged mouth, $a'$, channels, $b$, forming passage-ways in combination with the walls of the periphery of the tire proper connecting the apertures, $a$, with the outer surface of the cover at its edges.

In witness whereof I have hereunto set my hand this 30th day of March, A. D. 1899.

T ELWOOD COMLY.

Witnesses:
J. T. CROSS,
LEWIS H. VAN DUSEN.